United States Patent
Adeel et al.

(10) Patent No.: US 12,197,492 B2
(45) Date of Patent: *Jan. 14, 2025

(54) SYSTEM AND METHOD FOR MULTI-MEDIA CONTENT BOOKMARKING WITH PROVENANCE

(71) Applicants: Getac Technology Corporation, New Taipei (TW); WHP Workflow Solutions, Inc., North Charleston, SC (US)

(72) Inventors: Muhammad Adeel, Edina, MN (US); Thomas Guzik, Edina, MN (US)

(73) Assignees: Getac Technology Corporation, Taipei (TW); WHP Workflow Solutions, Inc., North Charleston, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/380,120

(22) Filed: Oct. 13, 2023

(65) Prior Publication Data

US 2024/0037135 A1 Feb. 1, 2024

Related U.S. Application Data

(63) Continuation of application No. 17/875,157, filed on Jul. 27, 2022, now Pat. No. 11,880,404.

(51) Int. Cl.
*G06F 16/44* (2019.01)
*G06F 3/0484* (2022.01)
*G06F 16/41* (2019.01)

(52) U.S. Cl.
CPC ............ *G06F 16/44* (2019.01); *G06F 3/0484* (2013.01); *G06F 16/41* (2019.01)

(58) Field of Classification Search
None
See application file for complete search history.

(56) References Cited

U.S. PATENT DOCUMENTS 11,461,190 B2 * 10/2022 Shemer ............... G06F 11/1469
2008/0109405 A1 5/2008 Tedesco et al.
(Continued)

OTHER PUBLICATIONS

U.S. Appl. No. 17/875,157, Notice of Allowance mailed Aug. 8, 2023, 18 pages.
(Continued)

*Primary Examiner* — William C Trapanese
(74) *Attorney, Agent, or Firm* — Finnegan, Henderson Farabow, Garrett & Dunner, L.L.P.

(57) ABSTRACT

A system and method for multi-media content bookmarking with provenance supplements multi-media content captured by media recording devices used or carried by a police officer during the course of his/her duties with information inputted by the police officer, wherein the added information is in the form of metadata. In at least one embodiment, a user interface (UI) tool for inputting the supplemental metadata is the source of provenance for the metadata, and the supplemental metadata is tagged to the captured content in a manner that preserves the provenance of the captured content. In a further embodiment, the user interface further enables the officer to create an affidavit as to the veracity of the supplemental metadata. The supplemental metadata may be stored in conjunction with the captured multi-media content in a secure data storage, but the content itself is not altered, thereby maintaining provenance of the content.

20 Claims, 4 Drawing Sheets

(56) References Cited

U.S. PATENT DOCUMENTS

| | | |
|---|---|---|
| 2008/0229205 A1 | 9/2008 | Lee et al. |
| 2012/0236201 A1* | 9/2012 | Larsen ................... G06Q 30/02 |
| | | 348/468 |
| 2012/0246167 A1* | 9/2012 | Alexander .......... G06F 16/9562 |
| | | 707/E17.014 |
| 2012/0259788 A1 | 10/2012 | Alles et al. |
| 2013/0247111 A1* | 9/2013 | Templeman ............. H04N 5/76 |
| | | 725/55 |
| 2016/0092480 A1 | 3/2016 | Madison et al. |
| 2020/0233883 A1 | 7/2020 | Grendahl |

OTHER PUBLICATIONS

U.S. Appl. No. 17/875,157, Office Action mailed Mar. 31, 2023, 16 pages.

International Patent Application No. PCT/US2023/028384, International Search Report and Written Opinion mailed Nov. 10, 2023, 9 pages.

* cited by examiner

SYSTEM AND METHOD FOR MULTI-MEDIA CONTENT BOOKMARKING WITH PROVENANCE

This application is a continuation of U.S. application Ser. No. 17/875,157, filed on Jul. 27, 2022, and titled "SYSTEM AND METHOD FOR MULTI-MEDIA CONTENT BOOKMARKING WITH PROVENANCE," which is herein incorporated by reference in its entirety.

BACKGROUND

Law enforcement agencies rely on a variety of data content for everything from determining whether and how to investigate a situation to monitoring the investigation to reporting and analyzing results of the investigation. Content may be provided to police officers from an assortment of devices—electronic and otherwise—to carry out their duties. Such devices may include personnel-issued radios (in-vehicle and portable), body-worn cameras (BWCs), weapons (guns, Tasers, clubs, etc.), portable computers, and the like. In addition, vehicles such as cars, motorcycles, drones, bicycles, etc., may be equipped with electronic devices associated with the vehicle, such as cameras, sirens, beacon lights, spotlights, personal computers, etc. Such a variety of content may be used to achieve the different functions and missions of the police. For example, recorded content of a location or incident scene may be analyzed to determine the advisability of entering that location or scene in pursuit of an investigation. Content obtained at a crime scene may be transmitted and monitored to ensure the safety of personnel or gather evidence. Content obtained after an investigation or part thereof may be used to prepare reports or to be incorporated with content obtained at the scene for analysis and decision making. Machine learning may assist in the analysis and decision making.

Even more, in recent years, police have been required to take on greater levels of responsibility and accountability for providing evidence of their actions and interactions with the public. For example, this has resulted in police vehicles being equipped with dashboard-mounted cameras to record street traffic and other activities occurring in or near the police vehicle. Most recently, police officers are now required to have BWCs to record the events and conversations occurring between the individual officer wearing the BWC and anyone around him/her. As such, on any given day or duty time, a police officer will record and capture, via these or other recording or capturing devices, a substantial amount of multi-media content. More importantly, often some portion(s) of that captured content relates to critical or noteworthy events, including crimes or other incidents in progress, altercations with the police officers and scenes of recently occurred crimes or incidents.

Some officers to not do anything for the purpose of transferring that content beyond bringing their vehicle or equipment to a specific location to be downloaded. However, officers can often have or provide significant additional details, insights, context, sentiments and the like with respect to some or all of the events that they recorded. Unfortunately, unless the officers themselves record those additional details, insights, etc. somewhere, those valuable and potentially critical pieces of information can be lost over time due to fading memories.

Therefore, there is a need for officers to be able to record their additional information and insights with the captured content at, near or otherwise proximate with the transferring and storage of the captured content without compromising the integrity or provenance of such captured content.

BRIEF DESCRIPTION OF THE DRAWINGS

The detailed description is set forth with reference to the accompanying figures. The use of the same reference numbers in different figures indicates similar or identical items or features, wherein.

DETAILED DESCRIPTION

This disclosure is directed to describing a system and method for multi-media content bookmarking with provenance. The example system, structure, method and operation described herein embody the ability for a user (i.e., a police officer) to capture and record data relating to observations, comments and insights to supplement the captured multi-media content. The application to be disclosed hereinafter is not intended to be limited only to specific implementations or configurations of the above-noted system, structure, method and operation. Rather, the disclosure is applicable to many embodiments of multi-media content capture and bookmarking with provenance. Provenance in the context disclosed herein may be defined as a record tracing the ownership history of certain items that helps to confirm their authenticity and value. In the context of data or content recorded or stored in a computer system, provenance may refer to the copy history of a piece of data, or the intermediate pieces of data utilized to compute a final data element, as in a database record or web site (i.e., "data provenance").

Multi-media content would be derived from sources such as cameras, microphones, official records, and the like that may be recorded content, stream content and/or content provided on a regular or periodic basis, or in response to an event or on demand, and such content may be of a variety of different types and formats. All of such content must be captured and stored for retrieval and reporting, analysis, and/or presentation in an efficient manner despite many differences in their collection, format, transmission, and quality, among others. The content may originate from the same scenario and/or may be delivered in real time or substantially real time. The content may also be provided or retrieved separately from the scenario but utilized to inform the scenario and lessons to be learned from it, and/or to make predictions and/or recommendations for future scenarios and decision making.

Unless otherwise suggested, content may include audio (e.g., voice, music, background), image (e.g., still photos or video), other types of sensor input (heat, moisture, orientation, motion), documentary (e.g., structured or unstructured records, notes, graphs), and more. Content may be uploaded from a physical device, e.g., an external drive or a computing device via a wired connection or a physical dock. Other types of content, such as official records or documents, may be in paper form and require scanning or manual entry. Content may also be provided and/or retrieved from databases or other electronic or enterprise storage. In many cases, content may refer to data and its metadata, or simply to the data itself.

Metadata is data that describes other types of data, such as content. Describing photographic content, metadata may include the date and time of image capture, image resolution, file name, and file type, for example. Metadata of video streams may also include these examples as well as bit rates, time stamps, start and stop times, etc. Video accompanied by audio, or audio alone, may include metadata on audio levels, bit rates, or compression types. Metadata of documents may include the names of authors or editors, number of pages or records, etc. Other metadata may include location, an event identifier, names of subjects or participants, or data source. Many of these may apply to more than one type of content.

Among the main features as disclosed herein, the system and method for multi-media content bookmarking with provenance is directed to supplementing the captured multi-media content with information inputted by the police officer from whom the multi-media content originates or to whom the content relates, wherein the added information is in the form of metadata. In at least one embodiment, the present invention incorporates a user interface (UI) tool for inputting the supplemental metadata that would be the source of provenance for the metadata, and the supplemental metadata is tagged to the captured content in a manner that does not destroy the provenance of the captured content.

In particular, the user interface (UI) interacts with an officer to create supplemental metadata allowing the officer to input additional data, context, insight, motivation, sentiments, and the like to the captured multi-media content of an event which is maintained in a secure online-store. The user interface allows the officer to view the captured multi-media content and create supplemental metadata entries in relation to events, locations and/or objects within the captured multi-media content (hereinafter, referred to as "bookmarking"). The user interface may further enable the officer to create an affidavit as to the veracity of the supplemental metadata that is connected to the captured multi-media content. The added supplemental metadata may be stored in conjunction with the captured multi-media content in the secure data storage, with references into the captured multi-media content as to where each item of supplemental metadata is placed, but the content itself is not altered, thereby maintaining provenance of the captured multi-media content.

In at least one embodiment, the supplemental metadata may be formed as textual descriptions of information, audio/visual input, category tagging, event information tagging, cross-references to other events or persons or items, and the like. The supplemental metadata may also be formed to be included when searching the captured multi-media content for specific objects, events, etc. Similarly, the supplemental metadata may be used to track objects through the captured multi-media content.

For example, in a traffic violation scenario, an officer may pull over a speeding car. Before leaving the police vehicle to address the driver, the office may activate a dashboard camera to begin video capture of the scene before the vehicle, perhaps including the license plate in the field of view. The license plate number may be captured and transmitted in real time to a data storage device in the police car as the officer approaches the driver and activates his/her BWC, which may have both video and audio transmission or storage capability. In the meantime, a device in the police vehicle or borne by the officer (such as the BWC) may detect the GPS coordinates of the stop and transmit the same to the data storage device. After scanning the driver's license and making sure that the driver's face is in the BWC's field of view, the officer may obtain the driver's signature on paper or electronically on a tablet. Both the image of the driver's license and the image of the driver's face may be stored on the BWC and/or transmitted to the data storage device. Upon returning to the police vehicle, the officer may record an oral report or type the report into a computer terminal connected to the data storage device in the vehicle.

As with the above-noted example, the multi-media content captured during the traffic violation scenario may include a notification of the stop that may be a simple radio signal but include a request/response communication including transmission of incident-related data such as a recording of the officer's voice or time- and location-related data. Images of the license plate and the immediate surroundings captured by the vehicle camera may be video, MPEG or other file types and resolutions, and in color. Images taken by the BWC may also be video or other file format in color or black-and-white and accompanied by audio. If the officer is able to get the driver's signature written on a paper form, that signature is generally unstructured content although it may be made in a specified location on the paper form that would be recognized by a scanner on the basis of its location on the form. If the signature is inputted into a touch-screen signature field of a tablet, the electronic signature may be stored as an image file on the tablet or in the vehicle's data storage device. The driver's license and registration may also be scanned, and those images may also be stored in the vehicle's data storage device. The officer's oral report may be in the form of an audio recording sent separately or with the textual report and/or associated images. If typed, the report may be sent as a text file. Information stored on the tablet or in the vehicle data storage device may be uploaded upon return to the police station or other check-in location.

In some embodiments, the multi-media content recorded by the data storage device in the police vehicle, along with the officer's report may be uploaded from the data storage device upon the officer's return to or checking in with the police station either via wire, wirelessly, by transferring an external storage element from the data storage device, or by mounting the data storage device itself onto a docking station. At the police station, the captured multi-media content, including metadata generated while the content was being created and/or captured, is uploaded onto the secure data processing and storage server.

In that regard, the various files and data transmissions from the different devices described above that make up the captured multi-media content may be of the same format type, but some are likely to be of different types with different metadata at different locations according to the particular format required by each of the source devices. Some source devices may send files/data of the same format type but may use different metadata and use different respective formats. In accordance with techniques described herein, when the captured multi-media content from individual police vehicles or police officers is uploaded at the police station, the secure data processing and storage server will be configured to recognize the various types and formats, and transform the metadata generated for the captured multi-media content into a format according to a universal schema.

If during the traffic violation scenario, an incident occurred that warranted attention from the police officer or requires follow-up (i.e., the driver was acting hostile toward the officer, another separate incident nearby occurs, the officer spots contraband in the car he/she is investigating, etc.), when at the police station, the officer may wish to attach personal notes, commentary, evidence or other information relating to the incident to the captured multi-media content. In that regard, the structure and operation provide the mechanism by which the officer or any other authorized user may attach such data to the captured multi-media content without compromising the provenance and integrity of the original captured content, as will be described in detail hereinbelow.

Certain implementation and operations described herein may be ascribed to the use of one or more servers; however, alternative implementations may execute certain operations in conjunction with or wholly within a different element or component of the system(s). Further, the techniques described herein may be implemented in a number of contexts, and several example implementations and contexts are provided with reference to the following figures. The term "techniques," as used herein, may refer to system(s), method(s), computer-readable instruction(s), module(s)m algorithms, hardware logic, and/or operation(s) as permitted by the context described above and throughout the document.

Figure 1:
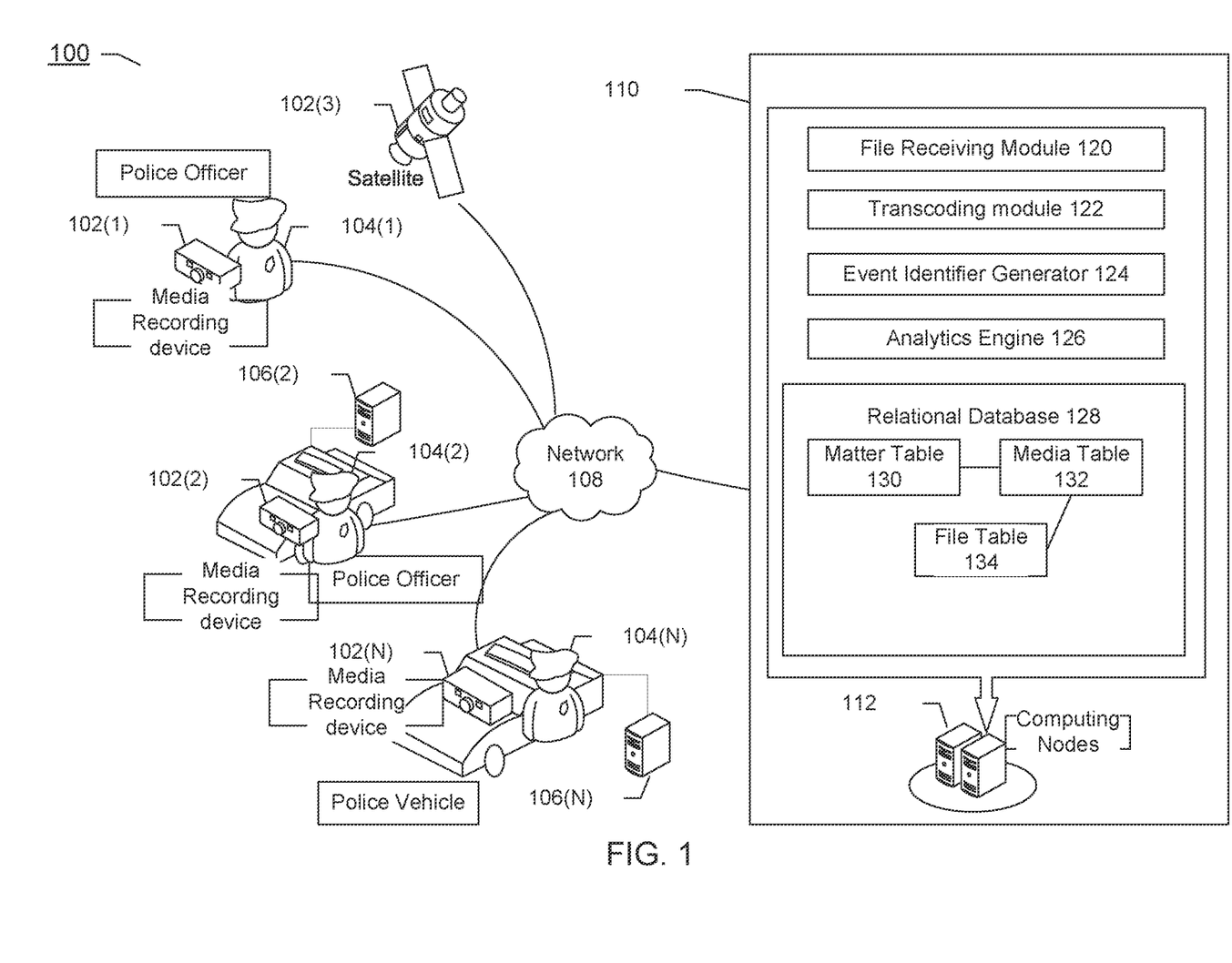
FIG. 1 illustrates an example architecture 100 for implementing at least a first embodiment described herein.

FIG. 1 illustrates an example architecture 100 for implementing at least a first embodiment. The architecture 100 may include media recording devices 102(1)-102(N). Each of the media recording devices 102(1)-102(N) may be a video recording device, an audio recording device, or a multimedia recording device that records both video and audio data. The media recording devices 102(1)-102(N) may include recording devices that are worn on the bodies of police officers (i.e., BWCs), recording devices that are attached to the motor vehicles, personal transports, motorcycles, bicycles, etc., used by the police officers (i.e., dashboard mounted cameras). For example, a police officer 104(1) that is on foot patrol may be wearing the media recording device 102(1). In the same example, an officer 104(1) that is on vehicle patrol may be wearing a media recording device 102(2). Further, the vehicle of the police officer 104(N) may be equipped with the media recording device 102(N).

In a variation of this embodiment, in the case of a police officer 104(N) with a vehicle, the vehicle may be also equipped with a data storage device 106(2)-106(N) into which data captured by the media recording devices worn by the officer and mounted on the vehicle is centrally stored. In this embodiment, media captured by each of the media recording devices may be configured to at least one of (a) continuously stream media being captured to the data storage device in the vehicle; (b) automatically upload captured media when the media recording device comes within a predetermined range of the vehicle; or (c) uploading the captured media when the police officer initiates an upload operation, such as by attaching the BWC to a docking station in the vehicle or by activating a command button on the media recording device or on the computer terminal in the vehicle.

In a further embodiment, a satellite 102(3) may also be equipped and configured as a media recording device using a camera that acquires images in the visible and infrared range.

Each of the media recording devices 102(1)-102(N) may include on-board memory that stores the media recordings as data assets. Further, each media recording device may be equipped with communication capabilities for transmitting the captured media to at least the data storage device 106 located in the police vehicle. Further, the data storage devices 106(2)-106(N) may be equipped with communications capabilities for not only receiving captured media from nearby media recording devices, but also for transmitting captured media stored in them to a network 108 that is connected to communicate with a central server 110.

Specifically, in one example, the media recording device 102(1) may transmit captured media directly to the central server 110 via the network 108. In another example, the media recording device 102(2) may communicate with, as noted above, the data storage device 106 in the police vehicle, or with a computer terminal in the police vehicle being used by the police officer 104(2)-104(N). In turn, the computer terminal may forward the captured media recorded by the media recording device 102(2)-102(N) to the central server 110 via the network 108. Alternatively, the computer terminal may also forward the captured media stored in the data storage device 106(2)-106(N) to the central server 110 via the network 108.

The network 108 may be, without limitation, a local area network ("LAN"), a larger network such as a wide area network ("WAN"), a carrier network, or a collection of networks, such as the Internet. Protocols for network communication, such as TCP/IP, may be used to implement the network 108. The network 108 may provide telecommunication and data communication in accordance with one or more technical standards.

The central server 110 may be part of a facility that is operated by a law enforcement agency, or a facility that is operated by a third-party that provides services to the law enforcement agency. In at least one embodiment, the central server 110 may use computing nodes 112 to host various modules, such as a file receiving module 120, transcoding module 122, event identifier generator 124 and analytics engine 126. Each one of these modules is explained in more detail below.

The computing nodes 112 of the central server 110 may include general purpose computers, such as desktop computers, tablet computers, laptop computers, servers, or other electronic devices that are capable of receiving inputs, processing the inputs, and generating output data. In other embodiments, the computing nodes 112 may be virtual computing devices in the form of virtual machines or software containers that are hosted in a cloud. In one example, the central server may include a processor, a network interface coupled to the processor configured to enable communications via a communication network, a storage device for content and programming, a program stored in the storage device, wherein execution of the program by the processor configures the central server to perform various functions discussed herein.

The file receiving module 120 of the central server 110 receives the captured media from various media recording devices 102(1) to 102(N). The captured media may be transmitted to the central server 110 via the network 108 in the form of media files that may or may not include annotations captured in connection with the corresponding media file. The data content may be received over the network 108 via, for example, File Transfer Protocol (FTP), WebDAV, or other protocols. File receiving module 120 may also be configured to provide both upload and download, thereby enabling bidirectional file transfer. For example, the file receiving module 120 may send relevant annotations to one or more media recording devices for their media file by way of the central server 110. File receiving module 120 may operate substantively in real time, at periodic intervals, or waiting of upload notifications in a push architecture.

File receiving module 120 may validate incoming files, receive associated metadata, receive secure signatures associated with uploading multi-media files from physical media, and may delete files from physical media upon successful upload. File receiving module 120 may integrate with other systems such as a police case management system. For example, when a multi-media file is received, file receiving module 120 may request a case identifier from the police case management system and store the case identifier with the multi-media file. In this way, a multi-media file can be guaranteed to be associated with a case.

The transcoding module 122 may translate a received media file's format to another file's format. Transcoding may also be known as file conversion, refactoring and format recopy. For example, if a law enforcement installation has standardized on H.264 for video files, transcoding module 122 may transform incoming files in AVI format to H.264. For example, the transcoding of a media file may involve converting a file format of the media file to generate a copy of the media file that is in another file format.

The event identifier generator 124 may be used to generate a group matter in the form of an event identifier number (e.g., case ID) guaranteed to be unique. For example, event identifier generator 124 may use a globally unique identifier ("GUID") generator or remote procedure call (RPC) universal unique identifier ("UUID") generator to guarantee uniqueness. Alternatively, the event identifier generator 124 may be an auto-populating index value in a relational database.

The analytics engine 126 may periodically receive media files from the media recording devices 102(1)-102(N). Additionally, the analytics engine 126 may also receive telemetry information directly from each media recording device or an associated computing device. In various embodiments, the analytics engine 126 may obtain the media files and the telemetry information by data push or data pull. In data push, each media recording device may actively send the media files including the telemetry information to the analytics engine 126 on a periodic basis. In data pull, the analytics engine 126 may actively poll each media recording device for the media files including the telemetry information on a recurring basis.

The analytics engine 126 may receive components of the media file (e.g., annotations, which are discussed in more detail a later section) from media recording devices 102(1)-102(N) and store such information into its memory and/or a memory of the police case management system. In various embodiments, the analytics engine 126 may periodically pull data (e.g., just the annotations or the media file including the annotations) from each media recording device by sending a request for the media file and/or its corresponding annotations. Each media file may include annotations that document various aspects of the media file, such as the time and date at which the media file was recorded, the duration of the media file, the device identifier of the media recording device, the geolocation at which the media file is recorded, additional entries provided by the operator of the media recording device, etc. Accordingly, the analytics engine 126 may propagate relevant annotations (e.g., annotations that are flagged to propagated), to other media files of a same matter group (e.g., having a common event identifier).

In some embodiments, the analytics engine 126 may obtain supplemental information from the police case management system. The supplemental information may include incident reports, police investigation reports, law enforcement officer station assignments, patrol vehicle assignments, arrest records, judicial records, and/or other relevant information. The analytics engine 126 may correlate the supplemental information obtained from the police case management system with the annotations of a group (e.g., having a common event identifier) based on identification keys from the group annotations. The identification keys may include incident identifiers, case identifiers, personnel identification information, suspect identification information, time and date stamps, and/or so forth. The supplemental information from the police case management system may enable the analytics engine 126 to enhance the annotations of the matter table 130 related to an event identifier.

In at least one embodiment, the central server 110 may also include a relational database 128 that includes a matter table 130, a media table 132, and a file table 134 that are structured in a master-detail-detail relationship. The matter table 130 stores information relating to the matter group (or indicia why the files would be grouped together). All annotations that relate to the matter group are stored in the matter table 130. Generally, the matter table 130 also includes an identifier of any external data to be associated with the matter. In various embodiments, an identifier may be, without limitation, a case ID (e.g., the event identifier of the crime case in the police case management system used by the law enforcement).

The media table 132 is configured to store a binary file of media data content of media files and/or a reference to a location of each media file. Although the media table could be stored with the file table 134, the media table 132 is typically stored separate from the file table 134 because media files may be large. By virtue of separating the media file from the file table, text queries on the file table 134 are expedited. As a detail table, the matter table stores a reference to the matter it is associated with (i.e., an event identifier).

The file table 134 is configured to store annotations specific to the media file. The annotations may include, without limitation, descriptions of the media file and/or the context of the media file, such as name of the subject, cross-street, comments from the operator (e.g., police officer) of the media recording device at or near the time of recording, and other metadata. The file table 134 may have predetermined fields that include the event identifier (e.g., file ID), case ID, and the media file ID of the present that the present media file is associated with. These fields may be populated automatically at the beginning of the recording of the media file if the event identifier (e.g., file ID) is known. These fields may be populated during the recording of the media file, if the event identifier is determined during the recording, or may be added during a post-processing step (e.g., where a user manually enters the event identifier, or it is provided by the central server). Such annotations may be manually added by the operator of the media recording device or may be performed by automation, such as tagging, which may be performed via software tools and by scripting on the media recording device.

Many other sub-modules may reside in the computing nodes 112 of the central server 110. In general, any operation that may be performed on a multi-media file, be it to add data to the file, associate data/metadata to the file, delete data in the file, edit the file, transform the file, transcode the file, and the like may be performed by a sub-module. There may be sub-modules with redundant functionality.

Example Multi-Media Bookmarking System

Figure 2:
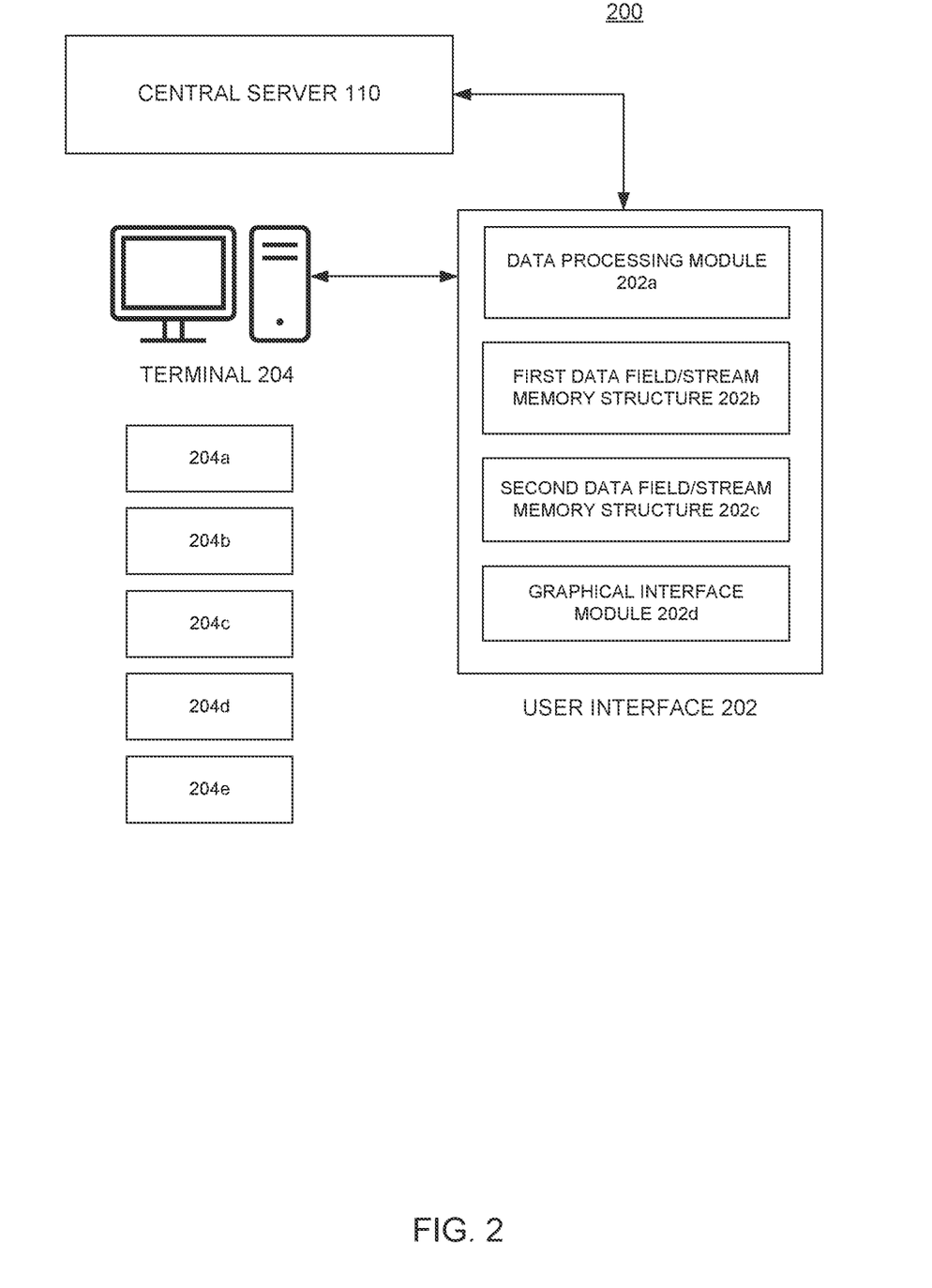
FIG. 2 a block diagram showing various components illustrative of the system for multi-media bookmarking according to at least a first embodiment described herein.

FIG. 2 is a block diagram showing various components illustrative of the system 200 for multi-media bookmarking. As discussed in the context of FIG. 1, the capture of multi-media content and the annotation thereof involves an interaction with appropriately configured media recording devices. In at least one embodiment, the system 200 for multi-media bookmarking according to the present invention may be embodied in (i) a dedicated terminal 204 programmed with a user interface (UI) 202 designed to allow a user to access the captured multi-media content and add bookmarking while preserving the provenance of the captured multi-media content, or (ii) any computer terminal, workstation, desktop computer, laptop computer, tablet device, or mobile device configured to communicate securely with the server 110 such that the user interface 202 presented on the device used to communicate with the server 110 allows the user to access the captured multi-media content and add bookmarking also while preserving the provenance of the captured multi-media content. For discussion purposes, the illustration shows the system 200 in the form of a computer terminal 204. In at least one embodiment, the supplemental metadata may be formed as textual descriptions of information, audio/visual input, category tagging, event information tagging, cross-references to other events or persons or items, and the like. The supplemental metadata may also be formed to be included when searching the captured multi-media content for specific objects, events, etc. Similarly, the supplemental metadata may be used to track objects through the captured multi-media content.

In at least one embodiment, as shown in FIG. 2, the system 200 includes the central server 110 connected to at least one computer terminal 204. As noted above, the computer terminal 204 may be implemented as any of a computer workstation, a desktop computer, a laptop computer, a tablet device, or a mobile device configured to communicate securely with the server 110. Specifically, the computer terminal 204 is equipped with the appropriate hardware, firmware, operating system and software to have the user interface (UI) 202 installed and operating therein. In terms of hardware, in order to receive the captured multi-media content stored in the central server 110 so as to allow a user to view the content, the terminal 204 is equipped with the appropriate central processing circuitry 204a, graphics processing circuitry 204b, RAM memory 204c, cache memory 204d and data storage 204e.

The user interface (UI) 202 is embodied in software and firmware organized to have a data processing module 202a, a first data field/stream memory structure 202b, a second data field/stream memory structure 202c and a graphical interface module 202d. The data processing module is configured to securely access the data storage of the central server 110 so as to select and download the appropriate data files for the multi-media content of interest to the user. The processing module 202a downloads the multimedia content data files into the first data field/stream memory structure 202b in a format so as to be accessible to the user. At the same time, the processing module 202a generates at least one of (a) a duplicate of the date stamps, time stamps, time starts/stops, location data, officer identifiers, vehicles identifiers, case identifiers, media type data, and any other annotations or metadata from the downloaded multi-media content; or (b) reference data points to track with the downloaded multi-media content such that the progression of the second data field/stream corresponds to the viewing or progression of the downloaded content in the first data field/stream based on corresponding reference data points in both the first and second data fields/streams memory structures 202b, 202c; or a combination of both (a) and (b).

The graphical interface module 202d generates a graphical user interface on the display of the terminal 204 with interactive elements and controls shown on the display such that the user may manipulate the viewing/playing of the downloaded multi-media content via conventional input devices including but not limited to keypads, keyboards, mouse devices and touch screens. In addition, the 202 may include the appropriate hardware, firmware and software to accommodate peripheral data storage or input devices, including but not limited to external storage drives, USB drives, cameras, microphones, speech recognition packages, and any other similar suitable devices.

Figure 3:
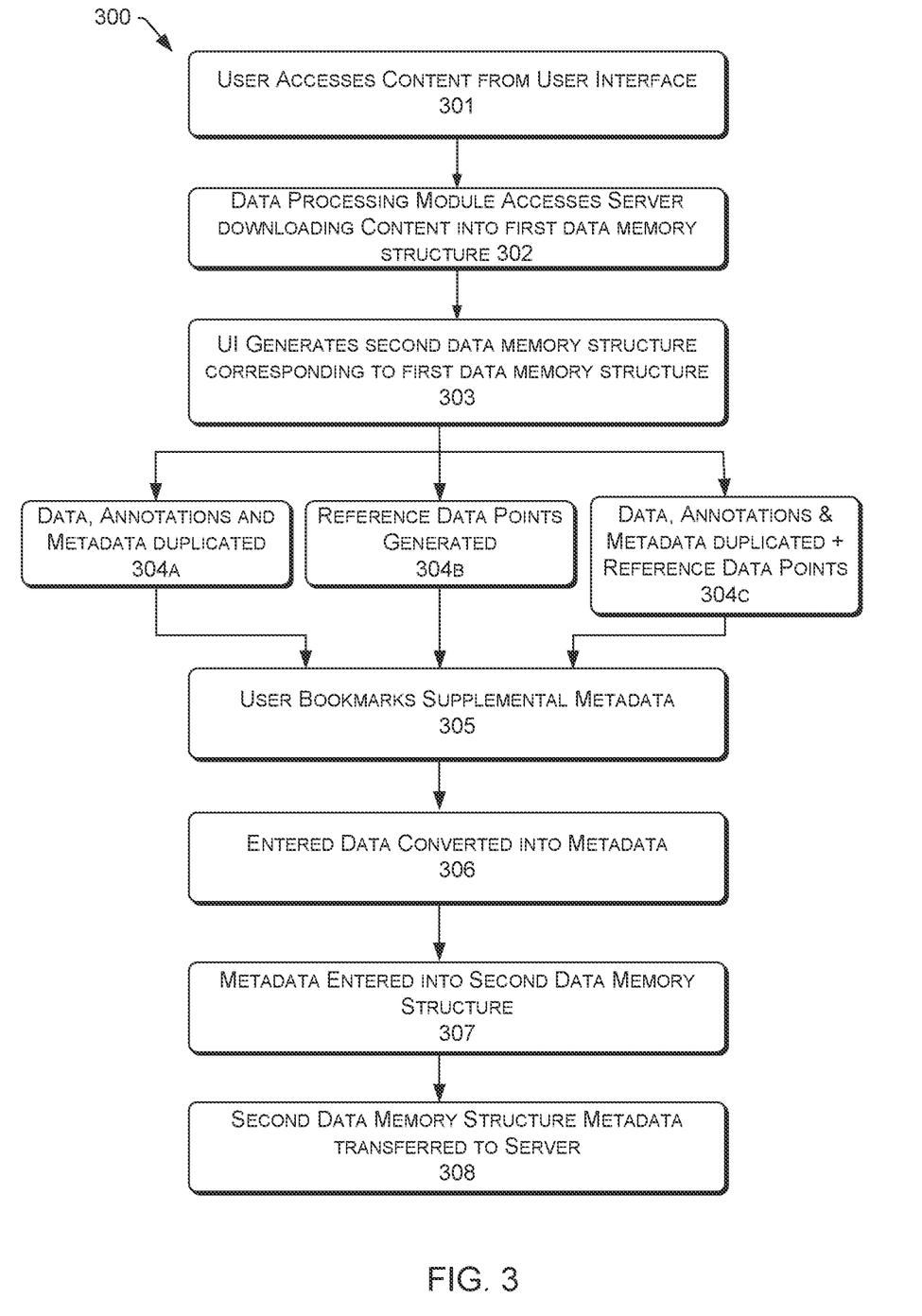
FIG. 3 is a block diagram of the general operation of the system according to at least a first embodiment described herein.

In at least one embodiment of the general operation 300 of the system 200, as shown in FIG. 3, a user accesses the captured multi-media content via the user interface (UI) 202 (Step 301). Upon selecting the desired file of the captured multi-media content as organized by the server 110, the processing module 202a accesses the central server 110 allowing the user to view the captured multi-media content on the display of the terminal 204 (Step 302) such that the user can play, pause, stop, fast forward and reverse the playing/viewing of the content, as well as any annotations and metadata already present with the content via interaction with the display and the operation of the graphical interface module 202d. This viewing of the content is performed via the first data field/stream memory structure 202b configured such that access to the content in the first data field/stream memory structure 202b is a view-only mode that allows play, pause, stop, fast forward and reverse operation of the content, but prevents any access to edit or change the content. As the user views the captured multi-media content, the user interface (UI) 202 generates and operates the second data field/stream memory structure 202c that corresponds to the content in the first data field/stream memory structure, respectively (Step 303). As described above, the second data field/stream memory structure may be generated by the data processing module 202a to, in at least one embodiment, duplicate at least the date stamps, time stamps, time starts/stops, location data, officer identifiers, vehicles identifiers, case identifiers, media type data, and any other annotations or metadata from the original captured multi-media content (Step 304a).

In another embodiment, the data processing module 202a generates the second data field/stream memory structure 202c to instead have reference data points to track with the captured multi-media content such that the progression of the second data field/stream memory structure 202c corresponds to viewing or progression of the content in the first data field/stream memory structure 202b (Step 304b) based on corresponding reference data points in both the first and second data fields/stream memory structures.

As a further embodiment, the second data field/stream memory structure may duplicate at least the date stamps, time stamps, time starts/stops, location data, officer identifiers, vehicles identifiers, case identifiers, media type data, and any other annotations or metadata from the original captured multi-media content, and also create reference data points to track with the captured multi-media content (Step 304c) such that the progression of the second data field/stream corresponds to viewing or progression of the content in the first data field/stream based on the annotations and metadata duplicated from the first data field/stream and the reference data points.

As the user is viewing the content via the first data field/stream memory structure 202b, he/she may bookmark supplemental metadata entries (Step 305) in relation to the events, locations and/or objects within the captured multi-media content by entering the data via conventional data means, including keyboard entry, audio recording, and attaching or linking other data files. The data entered by the user is converted into the metadata (Step 306) that is then inputted into the second data field/stream memory structure 202c via interaction with the graphical interface module 202d (Step 307) as the supplemental metadata according to the duplicated annotations/metadata and/or reference data points that correspond to the content that the user is currently viewing, or into which the user desires to input data. When the user has finished inputting data into the second data field/stream, the second data field/stream is transferred and stored in the server 110 as a separate metadata file but with reference data that relates that metadata file back to the corresponding file of the captured multi-media content (Step 308). As a result, additional data from the police officer or other authorized user connected to a specific data file of captured multi-media content is able to record and preserve additional information in connection with the content without compromising the provenance of the original content.

Figure 4:
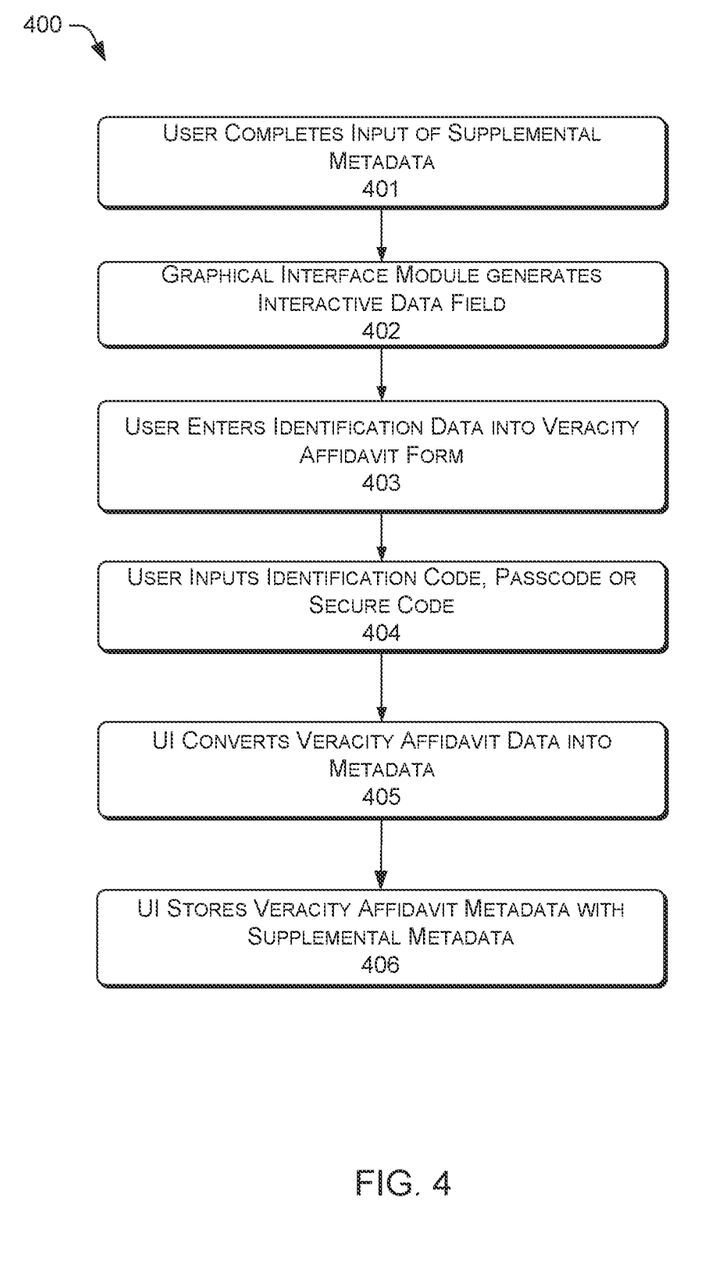
FIG. 4 is a block diagram of the general operation for generating veracity affidavit data file according to at least a first embodiment described herein.

In a further embodiment, the user interface (UI) 202 may also be configured to enable the officer to create an affidavit as to the veracity of the supplemental metadata that is connected to the captured multi-media content. As shown in FIG. 4, the general operation 400 for generating the veracity affidavit begins with the user completing the input of supplemental metadata (Step 401) as shown in Steps 306-308, the user interface (UI) 202 via the graphical interface module 202d generates an interactive data field for the user to input the veracity affidavit (Step 402). In at least one embodiment, the veracity affidavit may appear as a virtual or online fillable form. In this embodiment, the user enters data into the form such as his/her name, official identification code, secure passcode, case number, etc. (Step 403) to at least identify himself/herself and connect the veracity affidavit to the supplemental metadata file just created, as well as reference the corresponding data file of the captured multi-media content. The user then inputs an identification code, passcode or other secure code into the fillable form (Step 404) to indicate that the user (1) has reviewed the data entered into the fillable form, (2) acknowledges and attests to the accuracy of the entered data, and (3) finalizes the affidavit. The user interface (UI) 202 then uses the finalizing of the veracity affidavit as a signal to convert the veracity affidavit and the data inputted into metadata (Step 405) and stored with the supplemental metadata associated with it (Step 406). As with the supplemental metadata, the veracity affidavit metadata may be stored in conjunction with the captured multi-media content in the secure data storage of the central server 110, with references into the captured multi-media content. In a further embodiment, the veracity affidavit form may also be converted into a non-editable format (i.e., PDF) before being stored with the supplemental metadata file.

The application of embodiments as described hereinabove, along with the variety of content and content sources applied, is not limited to the law enforcement scenario. First responders to an emergency may rely on heat sensors, weather reports, infrared cameras, oxygen sensors, and the like to ensure their safety and guide their efforts. Medical personnel may rely on temperature sensors, oxygen sensors, x-ray images, radiation detectors, patient reports, and the like to inform their patient care decision making. Retail establishments may employ security cameras, entry sensors, motion trackers, inventory records, and purchase records to inform product placement, inventory management, even employee scheduling. However, for the purposes of illustration, this description will mainly refer to law enforcement scenarios. No limitation as to the applicability of the various techniques described herein to other scenarios, whether law enforcement or otherwise, is intended or should be inferred except where indicated or clear from the context.

In the foregoing specification, embodiments have been described with reference to numerous specific details that may vary from implementation to implementation. The specification and drawings are, accordingly, to be regarded in an illustrative rather than a restrictive sense. The sole and exclusive indicator of inventive scope, and what is intended by the applicants to be the scope, is the literal and equivalent scope of the set of claims that issue from this application, in the specific form in which such claims issue, including any subsequent correction.

What is claimed is:

1. A terminal, comprising:
   one or more processors; and
   memory including a user interface embodied in software and firmware organized to have a first data field/stream memory structure, a second data field/stream memory structure, and a graphical interface module, the memory further including one or more computer-readable media on which are encoded executable instructions that, if executed by the one or more processors, cause the one or more processors to perform operations comprising:
      accessing files of multimedia content and associated metadata stored in the first data field/stream memory structure with view-only access to the multimedia content;
      generating a duplicate of at least part of the metadata;
      storing the duplicate metadata in the second data field/stream memory structure;
      manipulating viewing/playing of the multimedia content stored in the first data field/stream memory structure via the graphical interface module;
      receiving supplemental metadata;
      storing the supplemental metadata into the second data field/stream memory structure in relation to the multimedia content stored in the first data field/stream memory structure; and
      tagging the supplemental metadata to the multimedia content in accordance with the relation to the multimedia content in the files stored in the first data field/stream memory structure without altering the multimedia content in the stored files and without destroying the provenance of the multimedia content in the stored files.

2. The terminal of claim 1, wherein manipulating viewing/playing of the multimedia content includes selectively playing, pausing, stopping, fast forwarding and reversing the playing/viewing of the multimedia content, and viewing annotations and metadata connected to the files.

3. The terminal of claim 1, wherein the metadata includes at least one of date stamps, time stamps, time starts/stops, location data, user identifiers, vehicles identifiers, case identifiers, media type data, annotations and metadata from the files.

4. The terminal of claim 1, wherein the metadata further includes reference data points corresponding portions of the multimedia content in the first data field/stream memory structure with content of the second data field/stream memory structure.

5. The terminal of claim 1, the operations further comprising:
   generating a veracity affidavit file associated with the supplemental metadata that is tagged to the multimedia content, including generating an interactive data field to input identification data, inputting an identification code, passcode or verification code indicate user acknowledgement of the inputted data, and finalizing the veracity affidavit file;

converting the veracity affidavit file and the inputted data into metadata; and storing the veracity affidavit file with the supplemental metadata associated therewith.

6. The terminal of claim 1, wherein the operations further comprise:

capturing the multimedia content; and storing the captured multimedia content in the first data field/stream memory structure.

7. The terminal of claim 6, wherein the operations further comprise, before the accessing:

receiving the multimedia content by streaming via a capturing device; and storing the received streamed multimedia content in the first data field/stream memory structure.

8. A terminal, comprising:

one or more processors; and memory including a user interface embodied in software and firmware organized to have a first data field/stream memory structure and a second data field/stream memory structure, the memory further including one or more computer-readable media on which are encoded executable instructions that, if executed by the one or more processors, cause the one or more processors to perform operations comprising:

receiving supplemental metadata;

storing the supplemental metadata into the second data field/stream memory structure in relation to multimedia content in files stored in the first data field/stream memory structure;

tagging the supplemental metadata to the multimedia content in accordance with the relation to the multimedia content in the files stored in the first data field/stream memory structure without altering the multimedia content in the stored files and without destroying the provenance of the multimedia content in the stored files;

generating a veracity affidavit associated with the supplemental metadata that is tagged to the multimedia content, including generating an interactive veracity affidavit form; inputting identification data, an identification code, passcode or verification code into the form to indicate user acknowledgement of the inputs to the form; and finalizing the veracity affidavit;

converting the veracity affidavit and the inputs into metadata; and storing the veracity affidavit with the supplemental metadata associated therewith.

9. The terminal of claim 8, wherein the user interface is further organized to have a graphical interface module, and the operations further comprise:

manipulating viewing/playing of the multimedia content stored in the first data field/stream memory structure via the graphical interface module, including selectively playing, pausing, stopping, fast forwarding and reversing the playing/viewing of the multimedia content, and viewing annotations and metadata connected to the files.

10. The terminal of claim 8, wherein the metadata includes at least one of date stamps, time stamps, time starts/stops, location data, user identifiers, vehicles identifiers, case identifiers, media type data, annotations and metadata from the files.

11. The terminal of claim 8, wherein the metadata further includes reference data points corresponding portions of the multimedia content in the first data field/stream memory structure with content of the second data field/stream memory structure.

12. The terminal of claim 8, wherein the operations further comprise:

capturing the multimedia content; and storing the captured multimedia content in the first data field/stream memory structure.

13. The terminal of claim 8, wherein the operations further comprise, before the accessing:

receiving the multimedia content by streaming via a capturing device; and storing the received streamed multimedia content in the first data field/stream memory structure.

14. The terminal of claim 8, wherein the operations further comprise, before the accessing:

uploading multimedia content via a wired connection or physical dock; and receiving multimedia content by streaming via a capturing device, wherein the multimedia content in the fields stored in the first data field/stream memory structure includes the uploaded multimedia content and the received streamed multimedia content.

15. A system for bookmarking multimedia content, comprising:

a data storage server; and a terminal communicatively connected to the data storage server, the terminal including:

one or more processors; and memory including a user interface embodied in software and firmware organized to have a first data field/stream memory structure and a second data field/stream memory structure, the memory further including one or more computer-readable media on which are encoded executable instructions that, if executed by the one or more processors, cause the one or more processors to perform operations comprising:

accessing data storage of the data storage server;

downloading data files of multimedia content into the first data field/stream memory structure so as to be accessible via the computer terminal, the first data field/stream memory structure being configured so as to store the downloaded data files and associated metadata and allow view-only access to the multimedia content therein;

receiving supplemental metadata;

storing the supplemental metadata into the second data field/stream memory structure in relation to the multimedia content in the downloaded data files stored in the first data field/stream memory structure;

tagging the supplemental metadata to the multimedia content in accordance with the relation to the multimedia content in the downloaded data files stored in the first data field/stream memory structure without altering the multimedia content in the data files on the data storage server and without destroying the provenance of the multimedia content in the data files on the data storage server;

generating a veracity affidavit associated with the supplemental metadata that is tagged to the multimedia content, including generating an interactive veracity affidavit form; inputting identification data, an identification code, passcode or verification code into the form to indicate user acknowledgement of the inputs to the form; and finalizing the veracity affidavit;

converting the veracity affidavit and the inputs into metadata; and storing the veracity affidavit with the supplemental metadata associated therewith.

16. The system of claim 15, wherein the user interface is further organized to have a graphical interface module, and the operations further comprise:

manipulating viewing/playing of the multimedia content stored in the first data field/stream memory structure via the graphical interface module, including selectively playing, pausing, stopping, fast forwarding and reversing the playing/viewing of the multimedia content, and viewing annotations and metadata connected to the downloaded data files.

17. The system of claim 15, wherein the metadata includes at least one of date stamps, time stamps, time starts/stops, location data, user identifiers, vehicles identifiers, case identifiers, media type data, annotations and metadata from the downloaded files.

18. The system of claim 15, wherein the metadata further includes reference data points corresponding portions of the downloaded data files in the first data field/stream memory structure with content of the second data field/stream memory structure.

19. The system of claim 15, wherein the operations further comprise:

capturing the multimedia content; and storing the captured multimedia content in the first data field/stream memory structure.

20. The system of claim 15, wherein the operations further comprise:

capturing the multimedia content; and storing the captured multimedia content in the first data field/stream memory structure.

* * * * *